United States Patent [19]

Sari

[11] Patent Number: 4,466,109
[45] Date of Patent: Aug. 14, 1984

[54] CARRIER RECOVERY ARRANGEMENT FOR SIXTEEN-STATE AMPLITUDE AND PHASE MODULATION AND RECEIVING SYSTEM FOR DIGITAL DATA, COMPRISING SUCH AN ARRANGEMENT

[75] Inventor: Hikmet Sari, Alfortville, France

[73] Assignee: U.S. Philips Corporation, New York, N.Y.

[21] Appl. No.: 367,184

[22] Filed: Apr. 9, 1982

[30] Foreign Application Priority Data

Apr. 29, 1981 [FR] France .................................. 81 08549

[51] Int. Cl.³ ............................................. H03D 3/22
[52] U.S. Cl. ..................................... 375/86; 329/112; 329/135; 375/39
[58] Field of Search ............... 329/112, 122, 124, 126, 329/135; 375/39, 42, 78, 86, 98, 118, 119, 120

[56] References Cited

U.S. PATENT DOCUMENTS

| | | | |
|---|---|---|---|
| 4,084,137 | 4/1978 | Welti | 375/42 |
| 4,255,713 | 3/1981 | Yoshida | 375/86 |
| 4,330,861 | 5/1982 | Impallomeni et al. | 375/86 |

Primary Examiner—Benedict V. Safourek
Attorney, Agent, or Firm—Thomas A. Briody; William J. Streeter; Charles E. Quarton

[57] ABSTRACT

Carrier recovery arrangement in a receiving system for digital data which are transmitted by sixteen-state amplitude and phase modulation (16 QAM), the arrangement having, successively six parallel paths ($V_1$-$V_6$) each including the series arrangement of a multiplying circuit ($M_i$) and a low-pass filter ($F_i$); a selection circuit for selecting one of the three pairs of filter output signals thus obtained; a phase control circuit having a Costas signal processing circuit receiving the selected pair of signals and producing a signal representative of the phase error of the received signal, a filter and a voltage-controlled oscillator; and a phase-shifting circuit receiving the output signal of the oscillator in order to couple this output signal to respective second inputs of the multiplying circuits ($M_1$)-($M_6$), this signal coupling being effected with a phase shift zero for ($M_1$), $\theta$ for ($M_3$), $2\theta$ for ($M_5$), and with a phase shift $\pi/2$ for ($M_2$), $\theta+\pi/2$ for ($M_4$), and $2\theta+\pi/2$ for ($M_6$), where $\theta$ is equal to $\tan^{-1}(\frac{1}{3})$.

4 Claims, 4 Drawing Figures

CARRIER RECOVERY ARRANGEMENT FOR SIXTEEN-STATE AMPLITUDE AND PHASE MODULATION AND RECEIVING SYSTEM FOR DIGITAL DATA, COMPRISING SUCH AN ARRANGEMENT

BACKGROUND OF THE INVENTION

The present invention relates to a receiving system for digital data which are transmitted by means of the sixteen-state amplitude and phase modulation method commonly referred to as 16 QAM and relates more specifically to a carrier recovery arrangement for such a system.

The 16 QAM modulation is obtained by adding together two quadrature carriers, each being modulated in amplitude (levels 1 or 3) and phase (0 or $\pi$). The modulated signal can be represented as:

$$x(t)=(2a_k+1) \sin(\omega t+b_k\pi)+(2c_k+1) \cos(\omega t+d_k\pi)$$

(where $a_k$, $b_k$, $c_k$, $d_k$ are each equal 0 or to 1 and t is located between kT and (k+1)T, T being the duration of a symbol). The article "Design and Performance of a 200 Mbit/s 16 QAM Digital Radio System", by I. Horikawa, T. Murase and Y. Saito, published in IEEE Transactions on Communications, December 1979, Vol. COM-27, No. 12, pages 1953-1958, describes a comparatively simple carrier recovery arrangement for 16 QAM modulation. As shown in FIG. 1, which represents the signal point configuration for 16 QAM modulation, only eight of the sixteen signal states of this modulation method have phases equal to $\pm\pi/4$ or $\pm 3\pi/4$, that is to say the same phases as the four-state phase-shift-keying method known as 4 PSK. The authors of the article therefore recommend to perform the carrier recovery operation only then when the signal has one of these eight states, and so to recover the carrier of a 16 QAM signal by means of a carrier recovery loop for a 4 PSK signal.

The disadvantage of this prior art method becomes rapidly apparent. If it is assumed that all states of the 16 QAM modulation have equal probabilities, the recovery loop would, statistically, operate only during half the time. But if the transmitted signal contains a long sequence whose states have phases differing from $\pm\pi/4$ and from $\pm 3\pi/4$, the loop is not active during this sequence and the loop runs the risk of unlocking, i.e. no longer tracking the phase.

SUMMARY OF THE INVENTION

The invention has for its object to provide a receiving system for digital data transmitted by means of 16 QAM modulation, in which the carrier recovery arrangement operates uninterruptedly and independently of the transmitted signal.

According to the invention, the carrier recovery arrangement comprises successively:

(A) an assembly of six parallel paths ($V_1$-$V_6$) each including a series arrangement of a multiplying circuit ($M_i$) and a low-pass filter ($F_i$), said assembly receiving the output signal from the transmission channel for producing three pairs of signals (p(t), q(t)), (r(t), s(t)), (u(t), v(t));

(B) selection circuit means comprising an amplitude-and-sign detection circuit receiving the pair of signals (r(t), s(t)), at the output of the low-pass filters ($F_3$, $F_4$) for producing a digital signal $\alpha$, which is equal to 1 or 0 depending on whether or not the value of $r(t)^2+s(t)^2$ is located between two pre-determined threshold values, and for producing a digital signal $\beta$, which is also equal to 1 or 0 in accordance with the value of the expression $$[sgn(r(t))\oplus sgn(s(t))]\oplus sgn[|r(t)|-|s(t)|]$$

where sgn denotes the signal and $\oplus$ is the Exclusive-OR-operator, said selection circuit means comprising a cascade arrangement of a switching circuit and Costas-type signal processing means, said cascade arrangement receiving said three pairs of signals from said assembly and said digital signals $\alpha$ and $\beta$ from said detection circuit for selectively producing an error signal representative of the phase error of the received signal in response to one of said three pairs of signals, the selection being effected by said switching circuit depending on the values of said digital signals $\alpha$ and $\beta$;

(C) a phase control circuit comprising a voltage-controlled oscillator and a filter for applying said error signal as a control voltage to said oscillator; and (D) a phase-shifting circuit receiving the output signal of said oscillator in order to apply it to second inputs of said multiplying circuits ($M_1$-$M_6$), this signal application being effected with a phase shift zero for ($M_1$), $\theta$ for ($M_3$) and $2\theta$ for ($M_5$), and with a phase shift $\pi/2$ for ($M_2$), $\theta+\pi/2$ for ($M_4$), and $2\theta+\pi/2$ for ($M_6$), $\theta$ being equal to $\tan^{-1}(\frac{1}{3})$.

The structure proposed herein is based on the consideration that the sixteen states of a signal which was subjected to a 16 QAM modulation may be considered as originating from the union of the states of four different 4 PSK modulations, the first two of which, referring to FIG. 2:

(a) and (b), correspond to states having the same phases but which can be distinguished from each other by means of amplitude detection and the other two of which, referring to FIG. 2:

(c) and (d), correspond to states having the same amplitude but which can be distinguished from each other by means of a sign detection by utilizing the projections on the axes cos $\omega t$ and sin $\omega t$.

DESCRIPTION OF THE DRAWINGS

An embodiment of the invention and the advantages obtained will now be further described with reference to the accompanying drawings, in which.

DESCRIPTION OF THE PREFERRED EMBODIMENT

Figure 1:
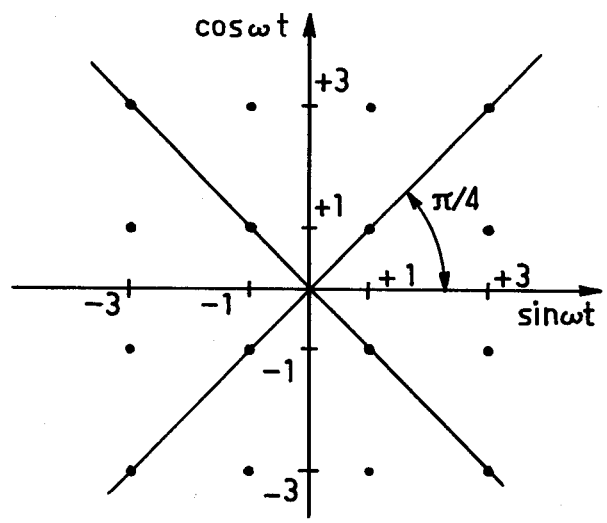
FIG. 1 shows the signal point diagram of the sixteen states of a signal modulated in accordance with the 16 QAM modulation method.

In the embodiment described with reference to FIG. 3, the carrier recovery arrangement in accordance with the invention comprises, successively, an assembly of six parallel paths $V_1$-$V_6$ connected to the output of a transmission channel 10 and conveying to a phase control circuit 11 one pair of three pairs of output signals of these paths, depending on the value of two coefficients which are applied to a switching circuit 12 by an amplitude-and-sign detection circuit, and a phase shifting circuit 14 enabling feedback of the correction signal produced by the circuit 11 to the six paths $V_1$-$V_6$.

The six paths $V_1$-$V_6$ each comprise a series arrangement of a multiplying circuit ($M_1$-$M_6$) and a low-pass filter ($F_1$-$F_6$). Each first input of the multiplying circuits $M_1$-$M_6$ receives the output signal from the transmission channel 10 and each second input of these multiplying circuits $M_1$-$M_6$ receives one of the signals produced by the phase shifting circuit 14, which will be described in detail hereinafter. At the output of the filters $F_1$-$F_6$ the respective signals p(t), q(t), r(t), s(t), u(t) and v(t) are available. The switching circuit 12 applies a pair of signals g(t), h(t) which is equal to one of the three pairs of signals (p(t), q(t)), (r(t), s(t)) and (u(t), v(t)) to the phase control circuit 11. The choice of which pair will be applied is determined in the switching circuit 12 by the values of two digital signals $\alpha$ and $\beta$ applied to the switching circuit 12 by the amplitude-and-sign detection circuit. In fact, the latter circuit receives the signals r(t) and s(t) present at the output of the two low-pass filters $F_3$, $F_4$, respectively, and performs amplitude and sign tests on r(t), s(t) in accordance with the procedure described in the foregoing.

Figure 2:
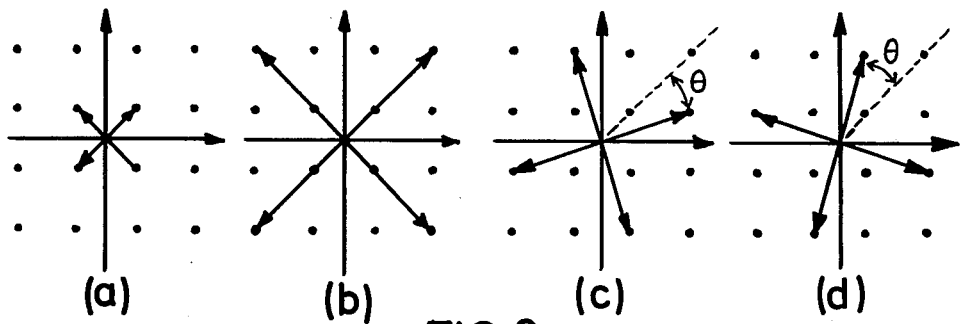
FIG. 2 shows the resolution of 16 QAM modulation into four 4 PSK modulations.

First, the amplitude-and-sign detection circuit comprises an amplitude detection circuit 21 including two squaring circuits 31 and 32, an adder 33, two comparators 34 and 35, and an Exclusive-OR-gate 36. The thresholds of the comparators 34 and 35 are equal to 3/2 and 7/2, respective (in the event in which the 16 QAM modulation has the levels 1, 3, −1 and −3), and the digital output signal $\alpha$ of the gate 36 assumes the value 1 if the value of r(t)$^2$+s(t)$^2$ is located between 3/2 and 7/2, and the value 0 in any other case. The amplitude-and-sign detection circuit also comprises a sign detection circuit 22 including a subtracting circuit (41, 42, 43) for the absolute values of r(t) and s(t), three comparators 44, 45 and 46 (for zero comparison) and two Exclusive-OR-gates 47 and 48. The digital output signal $\beta$ of the gate 48 assumes the value 0 or 1, depending on the logic result of the test performed in the circuit 22, and is defined by the expression:

$$\beta = [sgn(r(t)) \oplus sgn(s(t))] \oplus sgn[|r(t)| - |s(t)|]$$

where $\oplus$ denotes the Exclusive-OR-operator and the sign function sgn(x) is equal to 1 if x is positive and equal to 0 if x is negative. So with these circuits 21 and 22 the signals $\alpha$ and $\beta$ can be determined and consequently also the nature of the signal received:

If $\alpha=0$, the signal is in one of the states of the two 4 PSK modulations corresponding with (a) and (b) in FIG. 2, while in the event that $\alpha=1$, this signal is in one of the states of the 4 PSK modulation corresponding with (d) in FIG. 2 if $\beta=0$, or in one of the states of the 4 PSK modulation corresponding with (c) in FIG. 2 if $\beta=1$.

The switching circuit 12 can then provide for the transfer of the pairs of signals in accordance with the following rules:

(a) $\alpha=0$: g(t), h(t)=r(t), s(t)
(b) $\alpha=1$ and $\beta=0$: g(t), h(t)=u(t), v(t)
(c) $\alpha=1$ and $\beta=1$: g(t), h(t)=p(t), q(t)

six individual delay circuits being provided at the six inputs of switching circuit 12 to compensate for the time required to calculate the digital signals $\alpha$ and $\beta$ in the two circuits 21 and 22.

Figure 4:
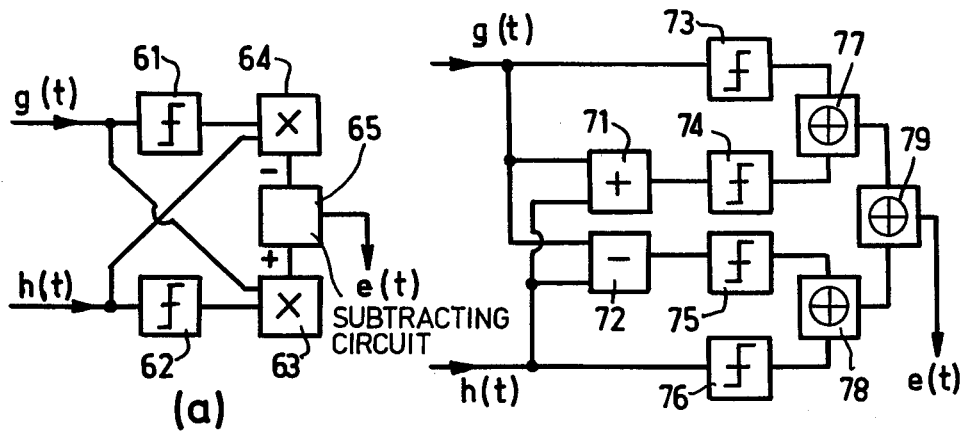
FIG. 4 shows two embodiments of a Costas processing circuit provided in the arrangement shown in FIG. 3.

In a circuit 51, the phase control circuit 11 performs a Costas-type of processing on that pair of signals, which after adequate commutation of the circuit 12 is conveyed to this circuit 11. The Costas processing circuit 51 shown at (a) in FIG. 4 is of the analog type and comprises two zero-comparators 61 and 62, two multiplying circuits 63 and 64 and a subtracting circuit 65. The error signal e(t) produced by the Costas processing circuit 51 is then applied to a voltage-controlled oscillator 53 via a filter 52. The output of the oscillator 53 supplies the output signal of the circuit 11 which is coupled to the second input of the multiplying circuits $M_1$-$M_6$, directly for the circuit $M_1$ and, for the circuits $M_2$-$M_6$, via the phase-shifting circuit 14. This circuit 14 imposes a phase shift $\pi/2$ on the signal applied to $M_2$, a phase shift $\theta=\tan^{-1}(\frac{1}{2})$ on the signal applied to $M_3$, a phase shift $\pi/2+\theta$ on the signal applied to $M_4$, a phase shift $2\theta$ on the signal applied to $M_5$ and a phase shift $\pi/2+2\theta$ on the signal applied to $M_6$. Finally, the output signals r(t) and s(t) of the paths $V_3$ and $V_4$, which here constitute in-phase and quadrature-phase demodulated signals are applied to a decision circuit, not shown.

The operating principle of arrangement whose structure is described in the preceding paragraphs is as follows. As the phases of the 16 QAM modulation are the phases of three 4 PSK modulations shifted relative to each other over an angle $\theta$ (actually four, as has appeared in the foregoing, but two of them have the same phases), the received signal is demodulated with three pairs of carriers corresponding to the respective reference axes of these three 4 PSK modulations, in the paths ($V_1$, $V_2$), ($V_3$, $V_4$), ($V_5$, $V_6$), respectively. By means of an amplitude-and-sign detection it can then be determined to which of the four 4 PSK modulations corresponding with (a)-(d) in FIG. 2 the signal is associated and which pair of signals must be injected into the phase control circuit 11 by the switching circuit 12. So in the arrangement in accordance with the invention, the carrier of a 4 PSK modulation is recovered by a Costas loop, but this loop is associated with logic circuits which decide which one of the three pairs of demodulation signals must be selected to be subjected to the Costas processing operation and thus to enable the determination of the phase error of the received signal and reintroduction thereof at the input of the arrangement.

The foregoing description of the invention and the illustrative embodiment are not to be considered in a limiting sense and, therefore, many modifications, variations or alternations may be practiced by those skilled in the art without departing from the spirit and scope of the invention.

Figure 3:
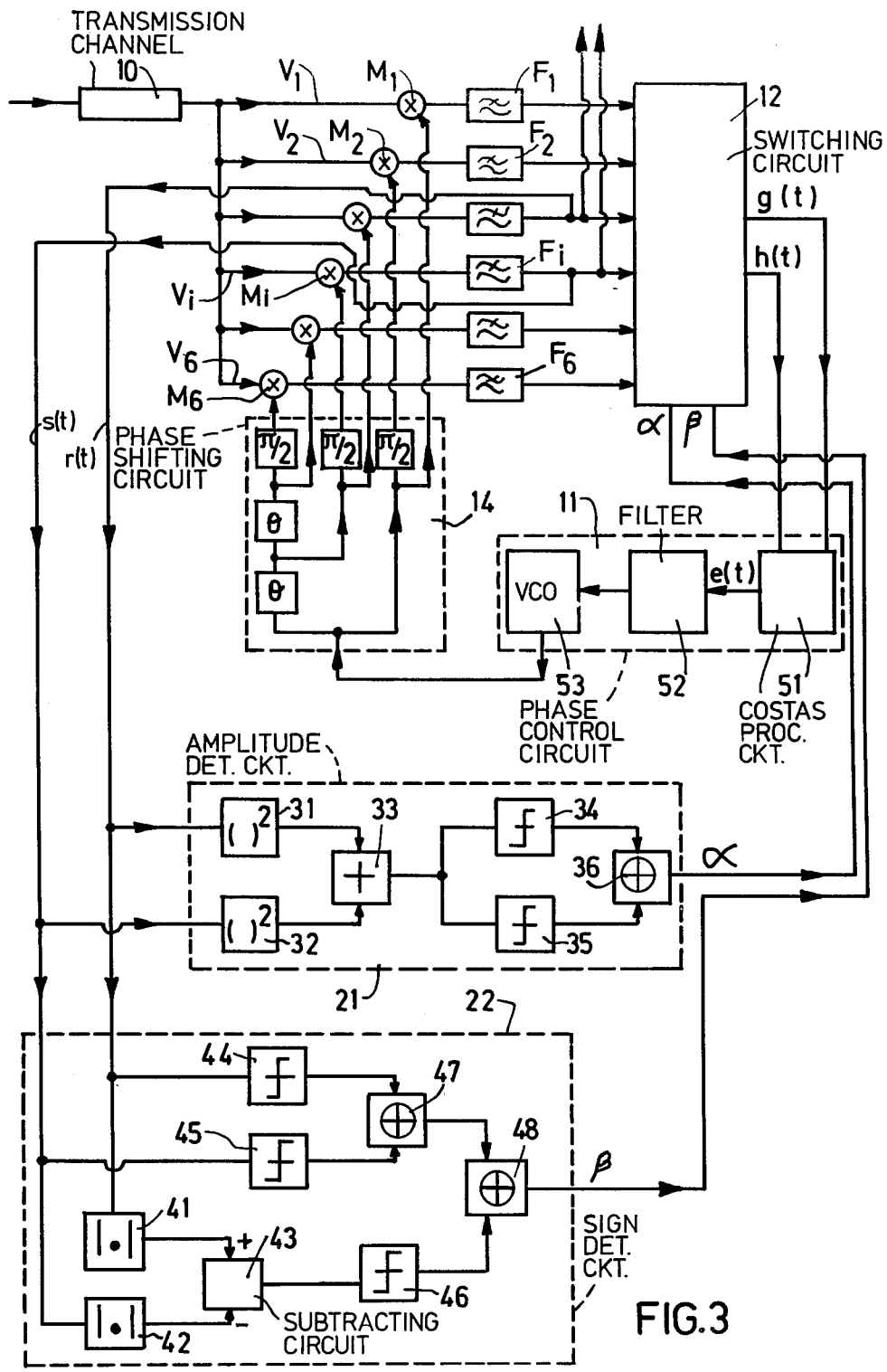
FIG. 3 shows an embodiment of the carrier recovery arrangement in accordance with the invention.

For instance, the Costas processing circuit 51 in FIG. 3 may be implemented as a digital circuit instead of an analog circuit of the type shown at (a) in FIG. 4. As shown at (b) in FIG. 4, this digital Costas processing circuit 51 comprises an adding circuit 71, a subtracting circuit 72, four zero-comparators 73-76 and three Exclusive-OR-gates 77-79. Examples of such Costas processing circuits are well known, an analog version being described in the book "Phaselock Techniques" by F. M. Gardner (John Wiley and Sons, 1979) and a digital version in the article by Horikawa, Murase and Saito mentioned hereinbefore.

Further, instead of arranging such a digital Costas processing circuit 51 at the output of the switching circuit 12, three identical digital Costas processing circuits 51a, 51b, 51c may be arranged in front of the switching circuit 12 so as to receive the output signals of filters $F_1$ and $F_2$, $F_3$ and $F_4$, $F_5$ and $F_6$, respectively. These circuits 51a, 51b and 51c will then produce the respective error signals $e_1(t)$, $e_2(t)$ and $e_3(t)$, and the switching circuit 12 then has to supply the same error signal e(t) to the loop filter 52 as in the embodiment of FIG. 3. It follows from the transfer rules for switching circuit 12 as set forth with respect to FIG. 3 that switching circuit 12 now must supply the error signal e(t) in accordance with the following logic rule:

$$e(t) = \bar{\alpha}.e_2(t) + \alpha.\bar{\beta}.e_3(t) + \alpha.\beta.e_1(t)$$

if $e_1(t)$, $e_2(t)$ and $e_3(t)$ are digital as in the case of FIG. 4(b), or FIG. 4(a) after analog/digital conversion. In this case, the switching circuit 12 may easily be realized by means of two inverters (to obtain $\bar{\alpha}$ and $\bar{\beta}$ from $\alpha$ and $\beta$), three AND-gates (the first one receiving $\bar{\alpha}$ and $e_2(t)$; the second one receiving $\alpha$, $\bar{\beta}$ and $e_3(t)$; and the third one receiving $\alpha$, $\beta$ and $e_1(t)$) and an OR-gate (receiving the outputs of the three AND-gates and supplying the error signal e(t)).

What is claimed is:

1. A carrier recovery arrangement in a receiving system for digital data which are transmitted by means of sixteen-state amplitude and phase modulation (16 QAM), characterized in that this arrangement comprises successively:

(A) an assembly of six parallel paths each including a series arrangement of a multiplying circuit and a low-pass filter, said assembly receiving the output signal from the transmission channel for producing six respective signals grouped sequentially as three pairs of signals (p(t), q(t)), (r(t), s(t)), (u(t), v(t));

(B) selection circuit means comprising an amplitude-and-sign detection circuit receiving a second pair in said three pairs of signals (r(t), s(t)) at the outputs of the respective low-pass filters for producing a digital signal $\alpha$, which digital signal is equal to 1 or 0 depending on whether or not the value of $r(t)^2 + s(t)^2$ is located between two predetermined threshold values, and for producing a digital signal $\beta$, which digital signal is also equal to 1 or 0 in accordance with the value of the expression {sgn (r(t))⊕sgn (s(t))}⊕sgn{|r(t)| − |s(t)|} where sgn denotes the sign and ⊕ is the Exclusive-OR-operator, and a cascade arrangement of a switching circuit and a Costas signal processing means, said cascade arrangement receiving said three pairs of signals from said assembly and said digital signals $\alpha$ and $\beta$ from said detection circuit for selectively producing an error signal representative of the phase error of the received signal in response to one of said three pairs of signals, the selection being effected by said switching circuit depending on the values of said digital signals $\alpha$ and $\beta$;

(C) a phase control circuit comprising a voltage-controlled oscillator and a filter for applying said error signal as a control voltage to said oscillator; and (D) a phase-shifting circuit for coupling the output signal of said oscillator to respective second inputs of said multiplying circuits, this output signal coupling being effected with phase shifts, in sequence, of zero, $\pi/2$, $\theta$, $\theta + \pi/2$, $2\theta$ and $2\theta + \pi/2$, $\theta$ being equal to $\tan^{-1}(\frac{1}{3})$.

2. An arrangement as claimed in claim 1, characterized in that said amplitude-and-sign detection circuit comprises:

(a) an amplitude detection circuit having two squaring circuits receiving said signals r(t) and s(t), respectively, an adder, two threshold comparators and an Exclusive-OR-gate, at the output of which the value of said digital signal $\alpha$ is available; and (b) a sign detectin circuit having a subtracting circuit for the absolute values of said signals r(t) and s(t), three comparators for zero comparison and two Exclusive-OR-gates, at the output of which the value of said digital signal $\beta$ is available; said switching circuit applying to the pahse control circuit said second pair of signals (r(t), s(t)) if $\alpha = 0$, a third pair of said three pairs of signals (u(t), v(t)) if $\alpha = 1$ and $\beta = 0$, and a first pair of said three pairs of signals (p(t), q(t)) if $\alpha = 1$ and $\beta = 1$.

3. An arrangement as claimed in claim 1 or 2, characterized in that said Costas processing means is a digital circuit means.

4. An arrangement as claimed in claim 1 or 2, characterized in that said Costas processing means is an analog circuit means.

* * * * *